(12) United States Patent
Huai et al.

(10) Patent No.: US 6,222,707 B1
(45) Date of Patent: Apr. 24, 2001

(54) BOTTOM OR DUAL SPIN VALVE HAVING A SEED LAYER THAT RESULTS IN AN IMPROVED ANTIFERROMAGNETIC LAYER

(75) Inventors: Yiming Huai; Geoffrey Anderson, both of Pleasanton; Ningjia Zhu; Wenjie Chen, both of Cupertino, all of CA (US); Fuminori Hikami, Nishinomiya (JP)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/221,799

(22) Filed: Dec. 28, 1998

(51) Int. Cl.[7] .................................................. G11B 5/39
(52) U.S. Cl. ................... 360/324.1; 360/324.11
(58) Field of Search .................... 360/113, 324.1–324.12

(56) References Cited

U.S. PATENT DOCUMENTS

| | | | |
|---|---|---|---|
| 4,900,650 | 2/1990 | Das | 430/319 |
| 4,912,584 | 3/1990 | Mallary et al. | 360/126 |
| 5,111,352 | 5/1992 | Das et al. | 360/113 |
| 5,126,971 | 6/1992 | Lin et al. | 365/171 |
| 5,311,387 | 5/1994 | Mallary | 360/126 |
| 5,331,728 | 7/1994 | Argyle et al. | 29/603 |
| 5,414,580 | 5/1995 | Levenson et al. | 360/123 |
| 5,462,637 | 10/1995 | Thiele | 216/22 |
| 5,486,968 | 1/1996 | Lee et al. | 360/126 |
| 5,512,394 | 4/1996 | Levenson et al. | 430/5 |
| 5,543,989 | 8/1996 | Westwood | 360/113 |
| 5,559,654 | 9/1996 | Das | 360/126 |
| 5,650,897 | 7/1997 | Cohen et al. | 360/126 |
| 5,659,451 | 8/1997 | Cohen et al. | 360/126 |
| 5,686,193 | 11/1997 | Westwood | 428/611 |
| 5,703,740 | 12/1997 | Cohen et al. | 360/126 |
| 5,751,526 | 5/1998 | Schemmel | 360/113 |
| 5,751,528 | 5/1998 | Nepela et al. | 360/126 |
| 5,761,013 | 6/1998 | Lee et al. | 360/126 |
| 5,764,056 | * 6/1998 | Mao | 360/113 |
| 5,766,780 | 6/1998 | Huang et al. | 428/692 |
| 5,883,764 | * 3/1999 | Pinarbasi | 360/113 |
| 5,966,012 | * 10/1999 | Parkin | 360/113 |
| 6,074,566 | * 6/2000 | Hsiao | 360/126 |

FOREIGN PATENT DOCUMENTS 10331916A   12/1998   (JP).

* cited by examiner

*Primary Examiner*—A. J. Heinz
(74) *Attorney, Agent, or Firm*—Sawyer Law Group LLP (57) ABSTRACT

A system and method for providing a spin valve is disclosed. The spin valve is formed on a substrate. In one aspect, the method and system include providing a seed layer including NiFe above the substrate and providing an antiferromagnetic layer on the seed layer. The seed layer provides the desired texture for the antiferromagnetic layer. The seed layer could include NiFeCr, NiFeNb, NiFeRh, or a NiFe/Cu multilayer. The method and system further include providing a pinned layer above the antiferromagnetic layer, the pinned layer being exchange coupled to the antiferromagnetic layer, providing a spacer layer above the pinned layer and providing a free layer above the spacer layer. In a second aspect, the method and system include providing a seed layer including Cu instead of NiFe. In a third aspect, the method and system include providing a synthetic antiferromagnetic layer in lieu of the antiferromagnetic layer and the pinned layer. In this aspect, the seed layer provides the desired texture for the synthetic antiferromagnetic layer. Note that in any aspect, the spin valve can include a bottom spin valve or a dual spin valve.

14 Claims, 6 Drawing Sheets

BOTTOM OR DUAL SPIN VALVE HAVING A SEED LAYER THAT RESULTS IN AN IMPROVED ANTIFERROMAGNETIC LAYER

FIELD OF THE INVENTION

The present invention relates to magnetoresistive heads and more particularly to a method and system for providing a seed layer for the antiferromagnetic layer in bottom and dual spin valves.

BACKGROUND OF THE INVENTION

Currently, spin valves are conventionally used for the magnetoresistive (MR) element in MR heads. A spin valve includes two magnetic layers, a free layer and a pinned layer, a spacer layer, and a conventional antiferromagnetic (AFM) layer. The spin valve may also include a capping layer. The free layer and pinned layer are separated by the spacer layer. The magnetization of the pinned layer is typically fixed by exchange coupling to the conventional AFM layer.

A conventional MR head may include either a top spin valve or a bottom spin valve. A top spin valve is one in which the pinned layer and AFM layer are near the top of the spin valve, while the free layer is near the bottom of the spin valve, in proximity to the substrate. A bottom spin valve is one in which AFM layer and the pinned layer are near the bottom of the spin valve, while the free layer is near the top of the spin valve.

Typically, the conventional AFM layer in a top spin valve is formed of PtMn, PtPdMn, IrMn, NiMn, CrPtMn, RhMn, NiO, or NiCoO. If PtMn, PtPdMn, IrMn, NiMn, CrPtMn, or RhMn is used for the AFM layer in a bottom spin valve, the exchange coupling between the pinned layer and the conventional AFM layer is quite small. This reduces the magnetoresistance of the spin valve, lowering the signal provided by the MR head as well as the magnetic and thermal stability of the MR head. Consequently, the conventional AFM layer in a bottom spin valve is typically NiO or NiCoO. Bottom spin valves are more desirable than top spin valves for a variety of reasons. Accordingly, what is needed is a system and method for providing bottom and dual spin valves that can use an AFM layer other than NiO or CoO. Moreover, it would also be desirable to provide a bottom spin valve which uses a synthetic AFM layer. The present invention addresses such a need.

SUMMARY OF THE INVENTION

The present invention provides a method and system for providing a spin valve. The spin valve is formed on a substrate. In one aspect, the method and system comprise providing a seed layer including at least NiFe above the substrate and providing an antiferromagnetic layer on the seed layer. In this aspect, the method and system could comprise providing a NiFeCr seed layer or providing a multilayer of NiFe and Cu as the seed layer. The seed layer provides the desired texture for the antiferromagnetic layer. The method and system further comprise providing a pinned layer above the antiferromagnetic layer, the pinned layer being exchange coupled to the antiferromagnetic layer, providing a spacer layer above the pinned layer, and providing a free layer above the spacer layer. In a second aspect, the method and system comprise providing a seed layer including Cu instead of NiFe. In a third aspect, the method and system comprise providing a synthetic antiferromagnetic layer in lieu of the antiferromagnetic layer and the pinned layer. In this aspect, the seed layer provides the desired texture for the synthetic antiferromagnetic layer.

According to the system and method disclosed herein, the present invention can provide a bottom spin valve or a dual spin valve having improved exchange coupling between the antiferromagnetic layer and the pinned layer, thereby increasing the magnetoresistance and overall system performance.

DETAILED DESCRIPTION OF THE INVENTION

The present invention relates to an improvement in magnetoresistive (MR) heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
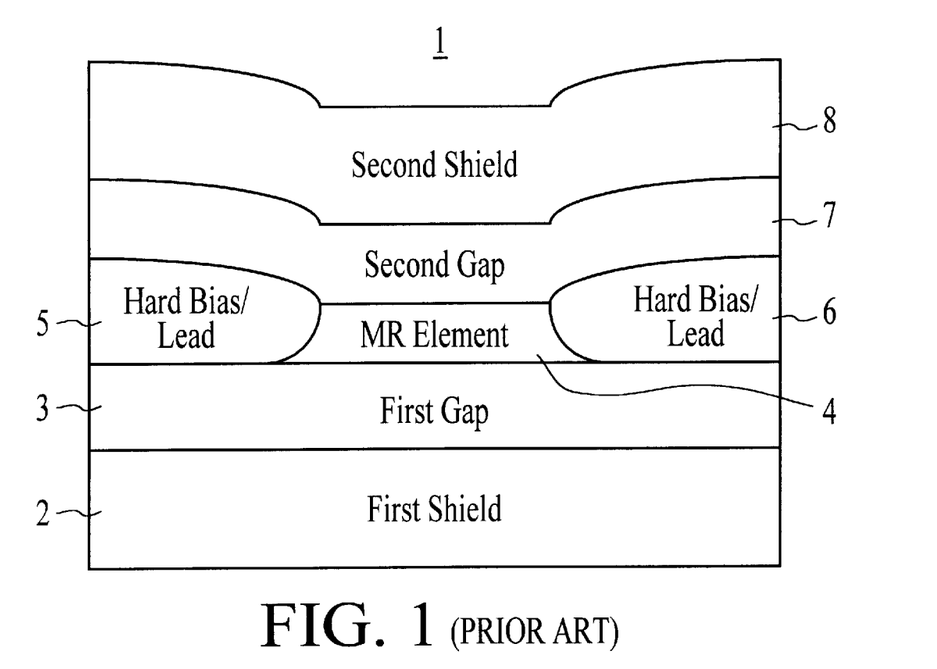
FIG. 1 is a diagram of a magnetoresistive head.

FIG. 1 is a diagram of a MR head 1. The MR head 1 is typically used in reading magnetic recording media (not shown) and may be incorporated in a merged head including a read head and a write head used in a hard disk drive. The sensing element of the MR head 1 is a MR element 4. The MR element 4 is a spin valve, discussed below. The MR head 1 also includes a first shield 2 and a second shield 8. The MR element 4 is isolated by from the first shield 2 and the second shield 8 by a first gap 3 and a second gap 7, respectively. The MR head 1 also includes hard bias and lead layers 5 and 6. Electrical current is carried to and from the MR element 4 by leads in the hard bias and lead layers 5 and 6. In addition, layers 5 and 6 magnetically bias the free layer (not depicted in FIG. 1) of the MR element 4. Thus, the free layer of the MR element 4 is biased to have a single domain structure, stabilizing the MR head 1.

The MR element 4 reads the magnetization of bits (not shown) in a track (not shown) using giant magnetoresistance (GMR). GMR causes the resistance of the MR element 4 to change in response to the magnetization of a bit. The magnetoresistance is given by $\Delta R/R$, where $\Delta R$ is the maximum change in resistance due to the magnetic field and R is the resistance of the spin valve at the saturation field. The larger the magnetoresistance, the larger the signal provided by the MR element 4 and larger the signal provided by the MR head 1.

Figure 2A:
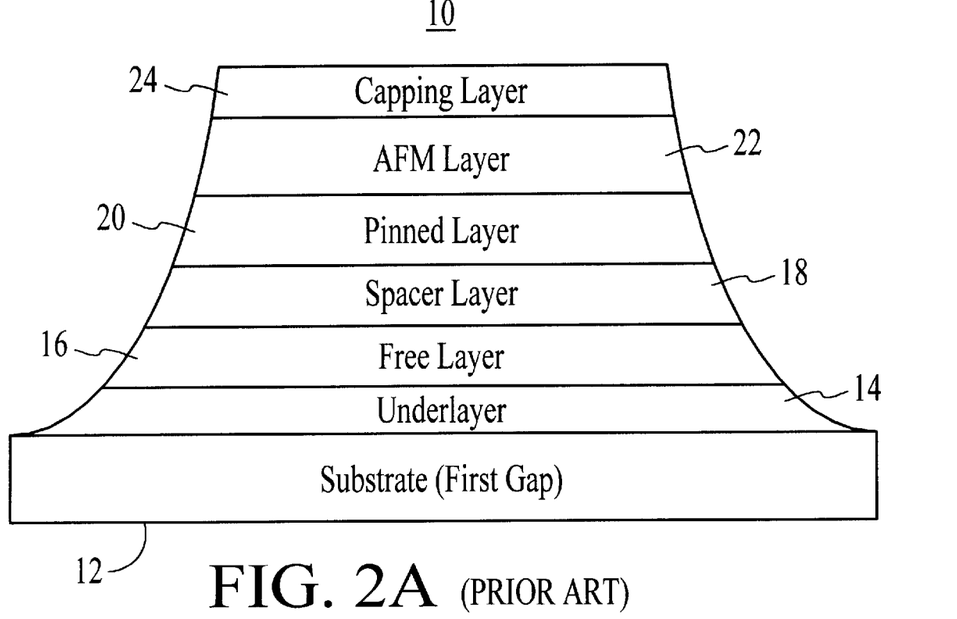
FIG. 2A is a diagram of a conventional top spin valve.

FIG. 2A is a diagram of a conventional top spin valve 10. The top spin valve 10 may be used as the MR element 4 in the conventional MR head 1. Typically, the top spin valve 10 has a magnetoresistance ($\Delta R/R$) of approximately six to eight percent. The conventional top spin valve 10 is formed on a substrate 12. The substrate 12 is the first gap 3. The top spin valve 10 includes a Ta underlayer 14, a free layer 16 on the underlayer 14, and a pinned layer 20 separated from the free layer 16 by a nonmagnetic spacer layer 18. The free layer 16 and the pinned layer 20 are magnetic. For example, the free layer 16 and pinned layer 20 are typically made of Ni, Fe, Co, or their respectively alloys. The spacer layer 18 typically contains copper, gold, or silver. The magnetization of the pinned layer is fixed by a conventional antiferromagnetic (AFM) layer 22. The conventional AFM layer 22 is typically PtMn, PtPdMn, IrMn, NiO, NiCoO, or a synthetic antiferromagnet. A Ta capping layer 24 is provided on the top of the spin valve 10.

Figure 2B:
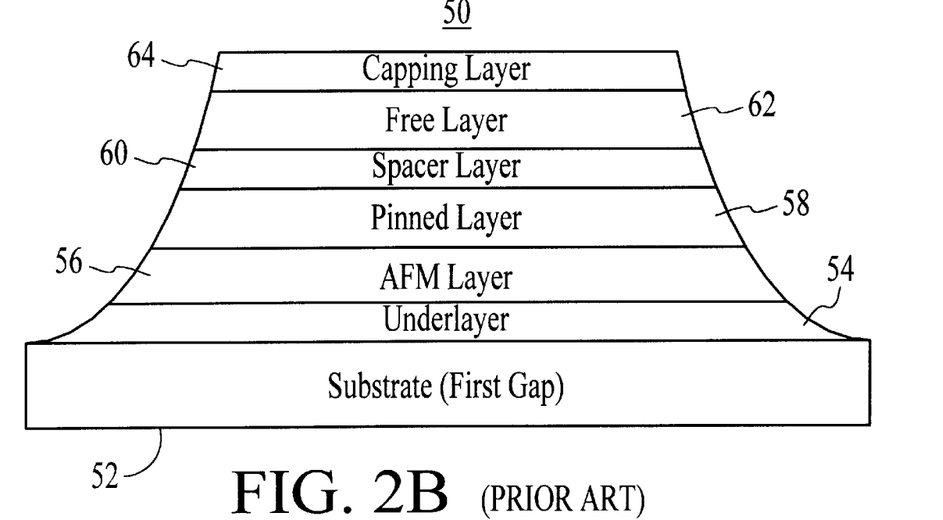
FIG. 2B is a diagram of a conventional bottom spin valve.

FIG. 2B is a diagram of a conventional bottom spin valve 50. The conventional bottom spin valve 50 can be used as the MR element 4 in the conventional MR head 1. The conventional bottom spin valve 50 is formed on a substrate 52 which may be the first gap 3 of the MR head 1. The bottom spin valve 50 includes a Ta underlayer 54, a conventional AFM layer 56, a pinned layer 58 on the conventional AFM layer 56, and a free layer 62 separated from the pinned layer 58 by a nonmagnetic spacer layer 60. The free layer 62 and the pinned layer 58 are magnetic. The magnetization of the pinned layer is fixed by a conventional AFM layer 56. The conventional AFM layer 56 is typically NiO or NiCoO. A Ta capping layer 64 is provided on the top of the spin valve 50.

Figure 3:
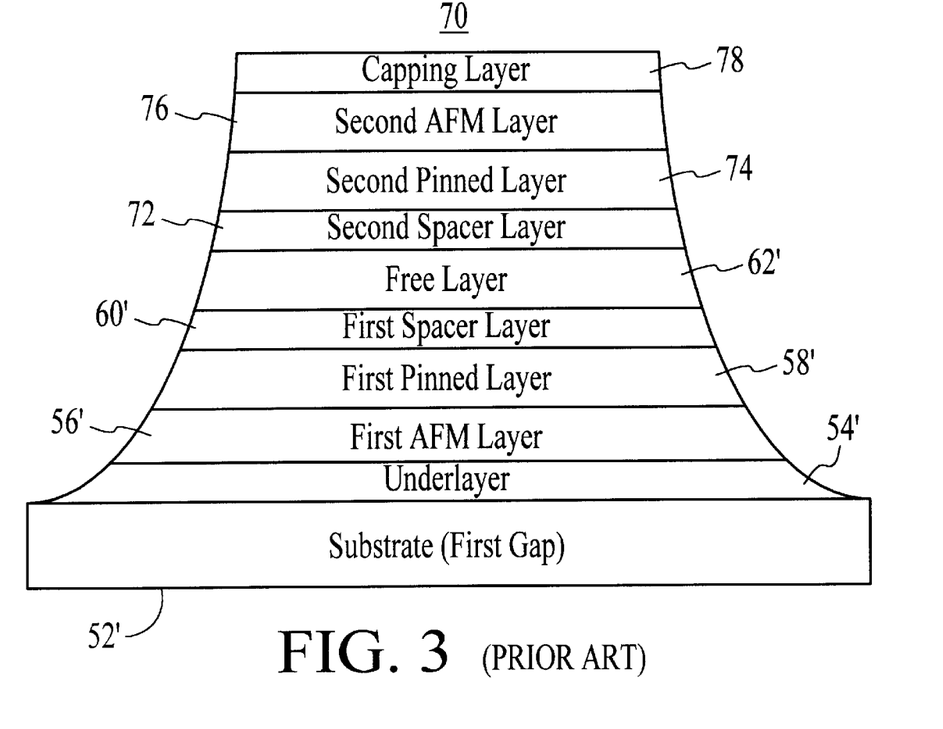
FIG. 3 is a diagram of a conventional dual spin valve.

FIG. 3 is a diagram of a conventional dual spin valve 70. The conventional dual spin valve 70 is basically a combination of the conventional bottom spin valve 50 and the top spin valve 10. Thus, the conventional dual spin valve 70 includes an underlayer 54', a first AFM layer 56', a first pinned layer 58', a first spacer layer 60', and a free layer 62' that are analogous to the underlayer 54, the AFM layer 56, the pinned layer 58, the spacer layer 60 and the free layer 62, respectively, of the conventional bottom spin valve 50. The conventional dual spin valve 70 also includes a second spacer layer 72, a second pinned layer 74, a second AFM layer 76, and a capping layer 78. The capping layer 78 is similar to the capping layer 64 of the conventional bottom spin valve 50.

A bottom spin valve is more desirable than a top spin valve. The angle made by the edges of the conventional bottom spin valve 50 is less critical than the conventional top spin valve 10. Referring back to FIG. 1, the MR element 4 is etched to provide the structure shown in FIG. 1. Etching creates a sloped profile at the edges of the MR element 4. Referring to FIG. 2A, in the conventional top spin valve 10, the free layer 16 is near the bottom of the top spin valve 10. Because the free layer 16 is near the bottom of the conventional top spin valve 10, the edges of the free layer 16 have a relatively long tail. As a result, the hard bias layers 5 and 6 may not adequately bias the free layer 16. Consequently, the free layer 16 may have a multiple domains. As a result, the MR head 1 using a conventional top spin valve 10 for the MR element 4 may be less magnetically stable and, therefore, subject to greater noise due to domain wall motion. Moreover, the width of the free layer 16 varies with the long tail. The size of the tail of the free layer 16 is not precisely controlled. Thus, the physical width of the free layer 16 is not well controlled. The physical width of the free layer 16 is related to the width of a track that can be read using the spin valve 10. Because the width of the free layer 16 is not well controlled, the magnetic track width of the MR element 10 may not be precisely controlled.

In contrast, the conventional bottom spin valve 50 of FIG. 2B has a free layer 62 at the upper portion of the conventional bottom spin valve 50. As a result, the free layer 62 does not have a long tail. Consequently, the hard bias layers 5 and 6 may more effectively bias the free layer 62. The free layer 62 has a single domain structure. This results in the MR head 1 using the conventional bottom spin valve 50 being less subject to noise due to domain wall motion. The track width is also better controlled in a MR head 1 using a bottom spin valve. The physical width of the free layer 62 is better controlled in the conventional bottom spin valve 50 because the free layer 62 is at the upper portion of the bottom spin valve 50 and closer to a resist structure (not shown) used in etching the bottom spin valve 50. Thus, the physical and track widths of the free layer 62 may be well controlled.

Referring back to FIG. 2A, the conventional top spin valve 10 also has a reduced magnetic coupling between the AFM layer 22 and the pinned layer 20. The AFM layer 22 is above pinned layer 20. Because of the profile of the top spin valve 10, the thickness of the AFM layer 22 above the pinned layer 20 at the edges of the spin valve 20 varies. The exchange coupling between the AFM layer 22 and the pinned layer 20 is proportional to the thickness of the AFM layer 22. Because the thickness of the AFM layer 22 above the pinned layer 20 varies, the exchange coupling between the AFM layer 22 and the pinned layer 20 is smaller closer to the edges of the conventional top spin valve 10.

Thus, use of the conventional bottom spin valve 50 for the MR element 4 in a MR head 1 is desirable. The bottom spin valve 50 using NiO and NiCoO for the AFM layer 56 can function. Similarly, a dual spin valve 70 using NiO and NiCoO for the first AFM layer 56' can function. However, those with ordinary skill in the art will realize that using other antiferromagnets for the AFM layer 56 or the first AFM layer 56' is desirable. For example, the use of IrMn, PtMn, PtPdMn, NiMn, RhMn, CrPtMn, or synthetic antiferromagnets based on these materials is desired. If the conventional bottom spin valve 50 is made using other conventional antiferromagnets, the magnetoresistance of the conventional bottom spin valve 50 is reduced. For example, one bottom spin valve 50 studied has three hundred Angstroms of PtMn as the AFM layer 56, twenty Angstroms of CoFe as the pinned layer 58, twenty-five Angstroms of Cu as the spacer layer 60, and a combination of ten Angstroms of CoFe and fifty Angstroms of NiFe as the free layer. The magnetoresistance of this layer is on the order of 5.35 percent. It has been determined that the reduction in magnetoresistance of the conventional bottom spin valve 50 is probably due to a reduced exchange coupling between the AFM layer 56 and the pinned layer 58. In some cases, the exchange field, which is a measurement of the exchange coupling, is less than the coercivity of the pinned layer 58. For example, in the bottom spin valve discussed above, the exchange field is 449 Oe, while the coercivity of the pinned layer is 598 Oe. Consequently, it would be desirable to provide a bottom spin valve which can use an antiferromagnet other than NiO or NiCoO as the AFM layer 56 without suffering a substantial loss in magnetoresistance.

The present invention provides a method and system for providing a bottom spin valve having improved exchange coupling between the AFM and pinned layers and improved magnetoresistance. The spin valve is formed on a substrate.

In one aspect, the method and system comprise providing a seed layer including at least NiFe above the substrate and providing an antiferromagnetic layer on the seed layer. For example, in this aspect, the method and system could comprise providing a NiFe/Cu multilayer, a NiFeCr layer, a NiFeNb layer, or a NiFeRh layer as a seed layer. The seed layer provides the desired texture for the antiferromagnetic layer. The method and system further comprise providing a pinned layer above the antiferromagnetic layer, the pinned layer being exchange coupled to the antiferromagnetic layer, providing a spacer layer above the pinned layer, and providing a free layer above the spacer layer. In a second aspect, the method and system comprise providing a seed layer including Cu instead of NiFe. In a third aspect, the method and system comprise providing a synthetic antiferromagnetic layer in lieu of the antiferromagnetic layer and the pinned layer. In this aspect, the seed layer provides the desired texture for the synthetic antiferromagnetic layer.

The present invention will be described in terms of a bottom spin valve using particular antiferromagnets in the AFM layer. However, one of ordinary skill in the art will readily recognize that this method and system will operate effectively for other types of antiferromagnets. One of ordinary skill in the art will also realize that the method and system can be used to provide a dual spin valve in addition to a bottom spin valve. In addition, although the present invention is described in the context of a contiguous junction device, one of ordinary skill in the art will realize that the method and system are consistent with an exchange biased device.

Figure 4:
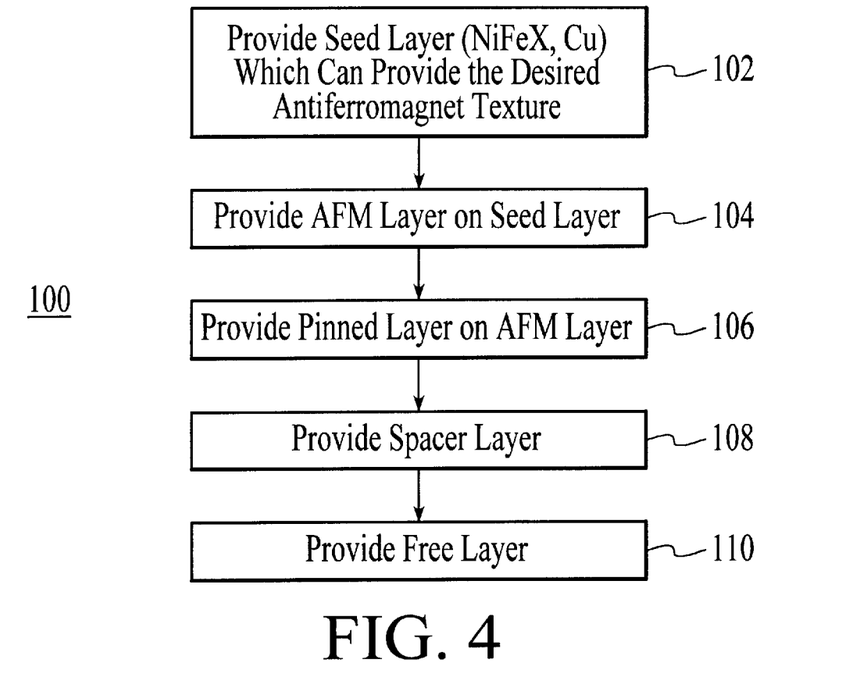
FIG. 4 is a flow chart depicting a method for providing a bottom spin valve in accordance with the present invention.

To more particularly illustrate the method and system in accordance with the present invention, refer now to FIG. 4 depicting a flow chart of a method 100 for providing a bottom spin valve in accordance with the present invention. The bottom spin valve formed in accordance with the present invention may be used in an MR read head, such as the MR read head 1 depicted in FIG. 1. As previously described, the MR read head 1 employing a bottom spin valve or dual spin valve in accordance with the present invention could be in a merged head also including a write head that is used in a disk drive. Referring back to FIG. 4, a seed layer is provided in step 102. The seed layer provided in step 102 could be provided on a substrate or on an underlayer, such as a Ta underlayer. The seed layer has several characteristics. The seed layer must provide a desired texture appropriate for the desired antiferromagnet. The desired antiferromagnets include IrMn, PtMn, PtPdMn, NiMn, RhMn, or CrPtMn. The seed layer includes at least NiFe or Cu. The seed layer also should have a relatively high resistivity. A seed layer having lower resistivity will shunt current away from the spin valve, reducing the magnetoresistance. In addition, it is desirable for the seed layer provided in step 102 to be corrosion resistant and relatively easy to manufacture. It is also desirable for the seed layer to be nonmagnetic so that the seed layer does not interfere with the operation of the spin valve being manufactured. NiFeX fulfills all these criteria Cu can be used but is less desirable because of its relatively low resistivity. Consequently, NiFeX is preferred for the seed layer provided in step 102. The X can indicate a material in the Cr family, such as chromium, niobium, or rhodium. The X can also indicate absence of any material (NiFe alone). Preferably, X indicates Cr. Also in a preferred embodiment, X indicates twenty to fifty atomic percent Cr. However, the requirements are that the seed layer be non-magnetic and that the seed layer provide the desired texture for the antiferromagnet to be grown, as described below. An AFM layer is then grown on the seed layer, via step 104. A pinned layer is provided on the seed layer, via step 106. A spacer layer and a free layer are then provided, via steps 108 and 110, respectively. The AFM layer provided in step 104 could include IrMn, PtMn, PtPdMn, NiMn, RbMn, or CrPtMn.

Figure 5:
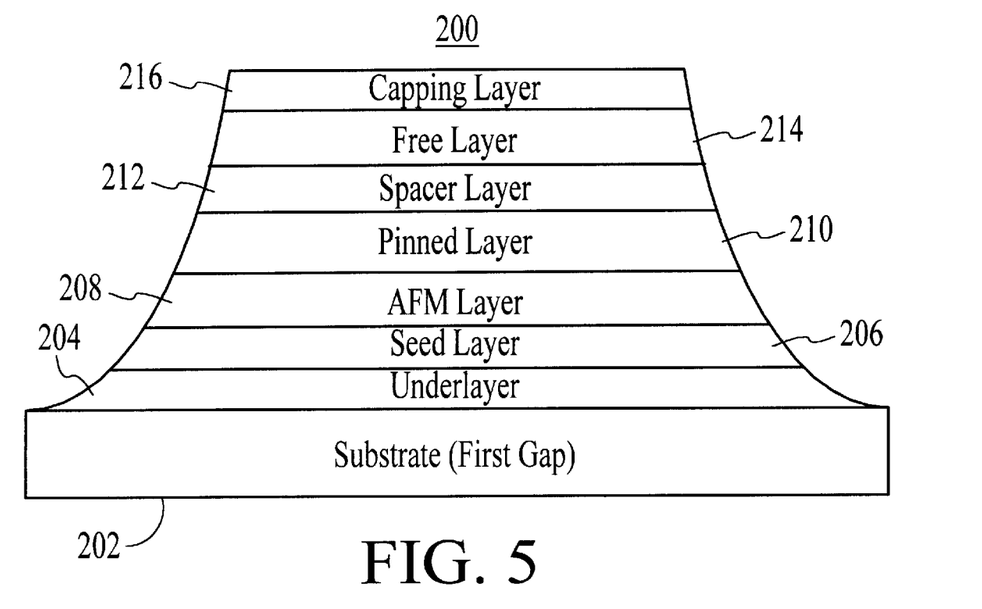
FIG. 5 is a diagram of a bottom spin valve in accordance with the present invention.

FIG. 5 depicts a bottom spin valve 200 accordance with the present invention. The bottom spin valve 200 is formed using the method 100 in which IrMn, PtMn, PtPdMn, NiMn, RhMn, or CrPtMn is used in step 104. The bottom spin valve 200 is grown on a substrate 202 and includes an underlayer 204, a seed layer 206, an AFM layer 208, a pinned layer 210, a spacer layer 212, a free layer 214, and a capping layer 216. The underlayer 204 and capping layer 216 are preferably Ta. The substrate is preferably the first gap 3 of the MR head 1. The pinned layer 210 and the free layer 214 are magnetic and preferably made of a material such as Ni, Fe, Co, or alloys thereof The spacer layer 212 is nonmagnetic and preferably Cu, Ag, or Au. The AFM layer 208 is preferably PtMn, IrMn, PtPdMn, NiMn, RhMn, or CrPtMn. The seed layer may include NiFeX, Cu, or a bilayer of NiFe and Cu. In a preferred embodiment, X is Cr. Also in a preferred embodiment, the seed layer includes between twenty and fifty percent Cr and is on the order of thirty to forty Angstroms thick. Of this range, approximately twenty-five percent Cr is desired. If the seed layer 206 is NiFe alone, approximately fifteen to twenty Angstroms is desired. If the seed layer 206 is Cu, then approximately twenty Angstroms is desired.

Figure 6:
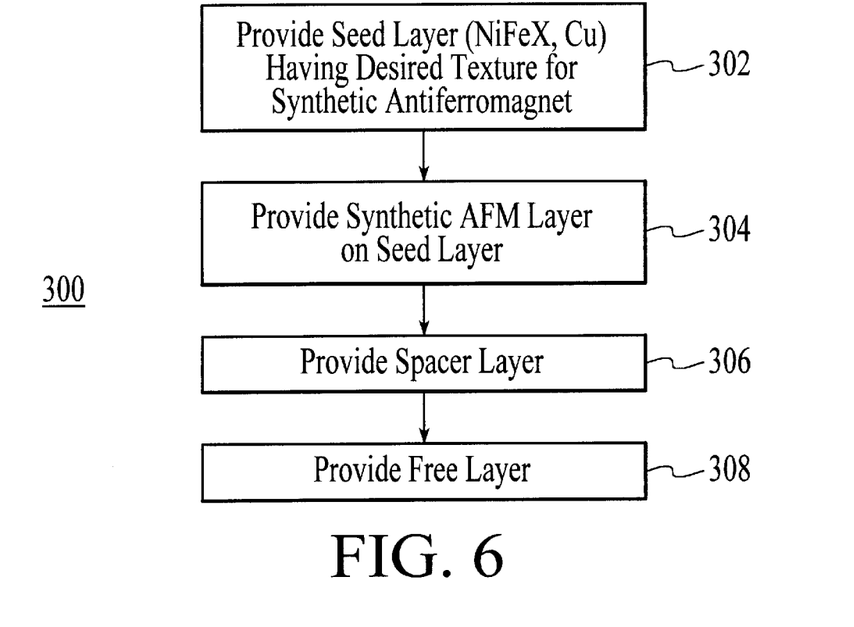
FIG. 6 is a flow chart depicting a method for providing a bottom spin valve using a synthetic antiferromagnet in accordance with the present invention.

FIG. 6 depicts a flow chart of a method 300 for providing a bottom spin valve having a synthetic antiferromagnet in accordance with the present invention. The bottom spin valve may be used in a MR read head 1 depicted in FIG. 1. A seed layer having a preferred texture for the antiferromagnet that will be used is provided in step 302. The seed layer in step 302 could be provided on a substrate or on an underlayer, such as a Ta underlayer. The seed layer has several characteristics. The seed layer has a texture appropriate for the desired synthetic antiferromagnet. The desired synthetic antiferromagnet includes a layer IrMn, a layer of PtMn, a layer of PtPdMn, a layer of NiMn, a layer of RhMn, or a layer of CrPtMn. The seed layer includes at least NiFe or Cu. The seed layer also should have a relatively high resistivity. A seed layer having lower resistivity will shunt current away from the spin valve, reducing the magnetoresistance. In addition, it is desirable for the seed layer provided in step 302 to be corrosion resistant and relatively easy to manufacture. It is also desirable for the seed layer to be nonmagnetic so that the seed layer does not interfere with the operation of the spin valve being manufactured. NiFeX fulfills all these criteria. Cu can be used but is less desirable because of its relatively low resistivity. Consequently, NiFeX is preferred for the seed layer provided in step 302. The X can indicate a material in the Cr family, such as chromium, niobium, or rhodium. The X can also indicate absence of any material (NiFe alone). Preferably, X indicates Cr.

A synthetic AFM layer is then grown on the seed layer, via step 304. In one embodiment, the synthetic AFM layer formed in step 304 includes a layer of PtMn and two layers of CoFe. The CoFe layers are separated by a Ru layer. In another embodiment, the synthetic AFM layer formed in step 304 includes a layer of IrMn and two layers of CoFe. In other alternate embodiments, the synthetic AFM layer formed in step 304 could include a layer of RhMn, NiMn, CrPtMn or PtPdMn and two layers of CoFe. The CoFe layers are separated by a Ru layer. The CoFe and Ru layers would each have the appropriate thickness to achieve strong antiferromagnetic coupling between the two CoFe layers and high magnetoresistance (ΔR/R). A spacer layer and a free layer are then provided, via steps 306 and 308, respectively.

Figure 7:
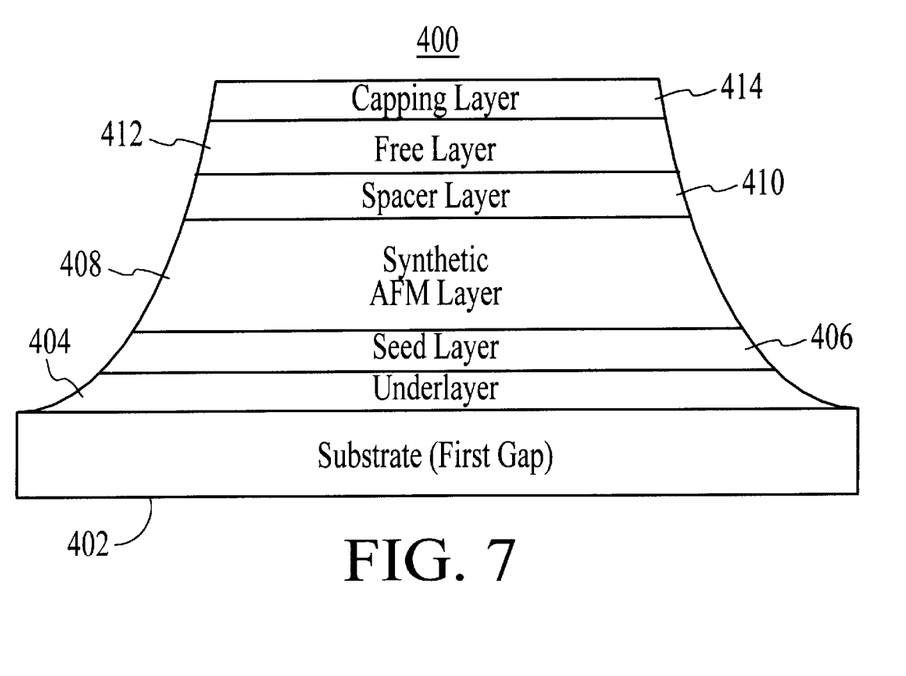
FIG. 7 is a diagram of a bottom spin valve having a synthetic antiferromagnet in accordance with the present invention.

FIG. 7 depicts the bottom spin valve 400 in which a synthetic antiferromagnet replaces the AFM layer 208 and the pinned layer 210. The bottom spin valve 400 is grown on a substrate 402 and includes an underlayer 404, a seed layer 406, a synthetic AFM layer 408, a spacer layer 410, a free layer 412, and a capping layer 414. The substrate is preferably the first gap 3 of the MR head 1 depicted in FIG. 1. Referring back to FIG. 6, the underlayer 404 and capping layer 414 are preferably Ta. The synthetic AFM layer 408 is preferably includes a layers PtMn, IrMn, RhMn, NiMn, CrPtMn, or PtPdMn followed by two layers of CoFe separated by a layer of Ru. The seed layer may be NiFeX, Cu, or a bilayer of NiFe and Cu. In a preferred embodiment, X is Cr. Also in a preferred embodiment, the seed layer includes between twenty and fifty atomic percent Cr and is on the order of thirty to forty Angstroms thick. Of this range, approximately twenty-five percent Cr is desired. If the seed layer 206 is NiFe alone, approximately fifteen to twenty Angstroms is desired. If the seed layer 206 is Cu, then approximately twenty Angstroms is desired.

Because of the presence of the seed layer 206 or 406, performance of the bottom spin valve 200 or 400, respectively, is improved. The seed layer 206 or 406 facilitates appropriate growth of the AFM layer 208 or the synthetic AFM layer 408, respectively. For example, NiFeX or Cu aids in growing the AFM layer 208 or the synthetic AFM layer 408 having the desired fcc (b 111) structure.

The seed layer 206 or 406 facilitates the growth of the AFM layer 208 or the synthetic AFM layer 408, respectively. Consequently, the exchange coupling, measured by the exchange field, is increased. The magnetoresistance is also increased above that of the conventional bottom spin valve 50 not using a seed layer 206 or 406. Table 1 summarizes the results for bottom spin valves. Most of the bottom spin valves of Table 1 include a Ta underlayer that is thirty Angstroms thick, an AFM layer and a pinned layer or a synthetic AFM layer, a Cu spacer layer of twenty-five Angstroms, a free layer including ten Angstroms of CoFe and fifty Angstroms of NiFe, and a Ta capping layer of thirty Angstroms. However, the first bottom spin valve listed, which has no seed layer, has a free layer that is different form the remaining bottom spin valves. The free layer for the first bottom spin valve includes fifty Angstroms of NiFe and twenty Angstroms of CoFe. Consequently, the first bottom spin valve has a lower resistivity.

As demonstrated by the data in Table 1, the bottom spin valves 400 having a seed layer in accordance with the present invention have improved magnetoresistance while using PtMn and IrMn in the AFM layer 208 or the synthetic AFM layer 408. Thus, NiO and CoO need not be used in the bottom spin valve 400. In addition, the method and system can be used to provide a dual spin valve.

Figure 8A:
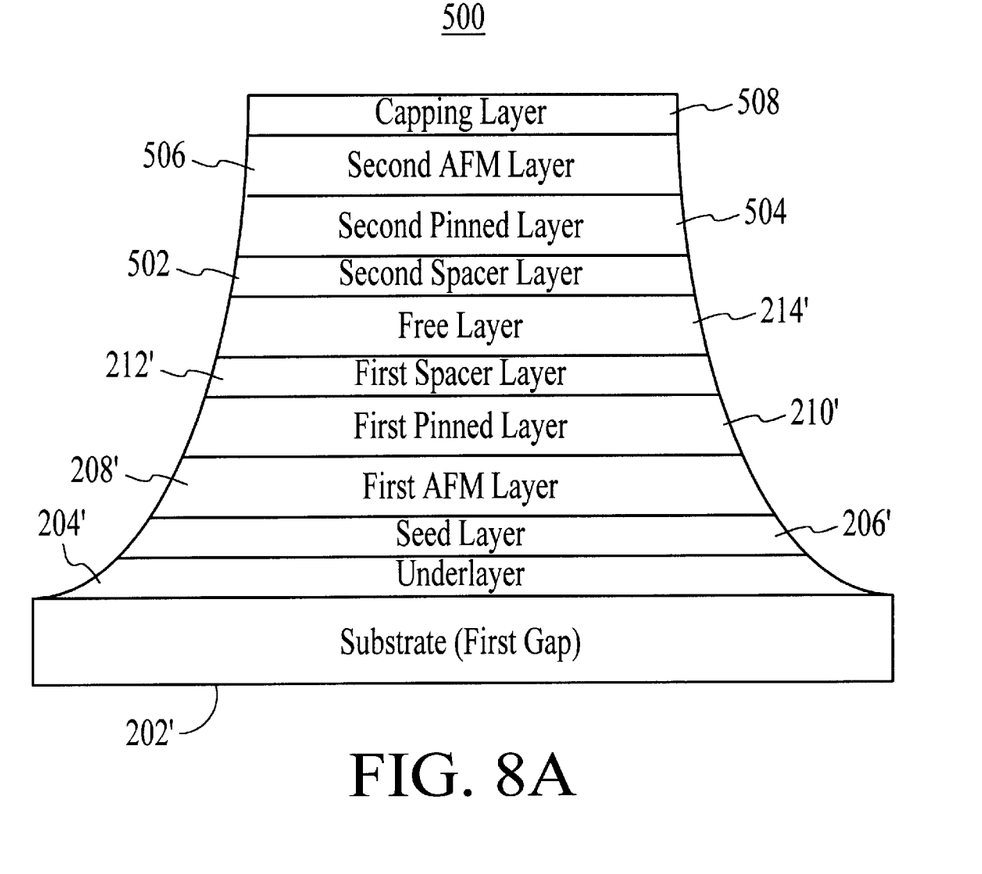
FIG. 8A is a diagram of a dual spin valve in accordance with the present invention.
Figure 8B:
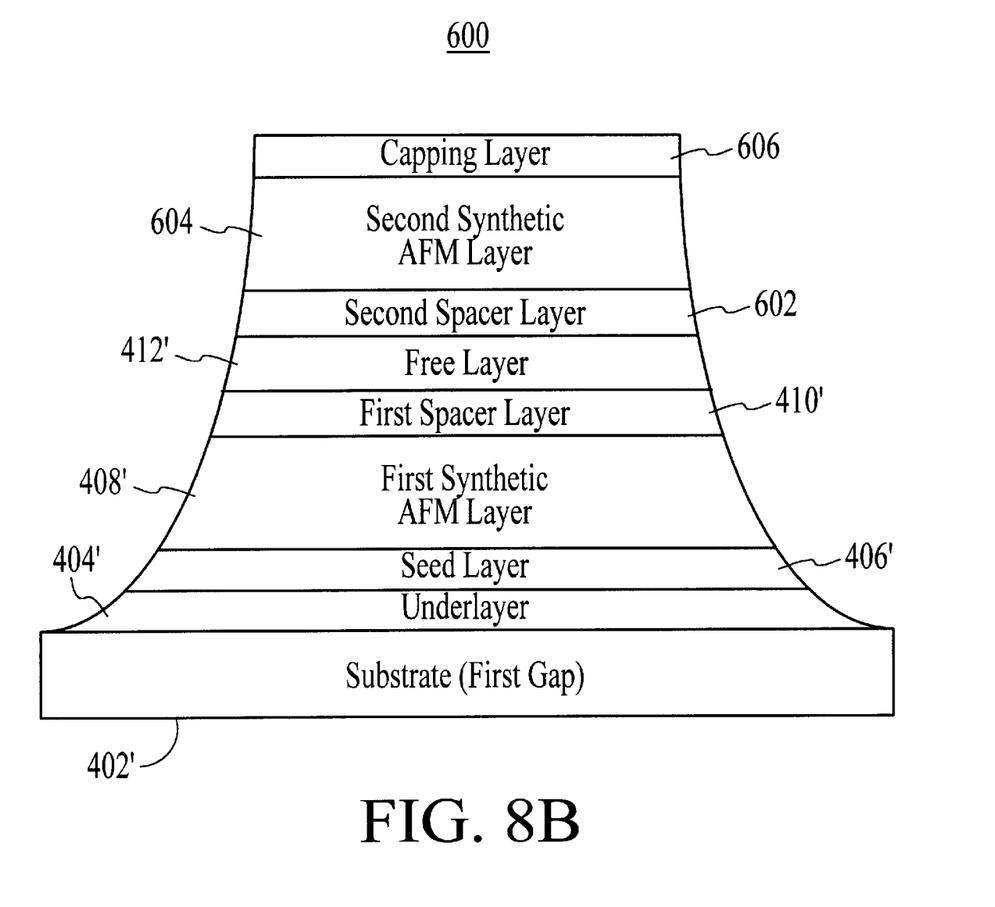
FIG. 8B is a diagram of a dual spin valve having synthetic antiferromagnets in accordance with the present invention.

As discussed previously, the present invention can also be used in conjunction with dual spin valves. FIGS. 8A and 8B depict dual spin valves 500 and 800, respectively, in accordance with the present invention. Referring to FIG. 8A, the dual spin valve 500 includes an underlayer 204', a seed layer 206', a first AFM layer 208', a first pinned layer 210', a first spacer layer 212', and a free layer 214' that are analogous to the underlayer 204, the seed layer 206, the AFM layer 208, the pinned layer 210, the spacer layer 212, and the free layer 214 of the bottom spin valve 200. The dual spin valve 500 also includes a second spacer layer 502, a second pinned layer 504, a second AFM layer 506, and a capping layer 508. The capping layer 508 is analogous to the capping layer 216 or 414. The second spacer layer 502, the second pinned layer 504, and the second AFM layer 506 may be made of those materials used for the first spacer layer 212', the first pinned layer 210', and the first AFM layer 208'.

Referring to FIG. 8B, the dual spin valve 600 includes an underlayer 404', a seed layer 406', a first synthetic AFM layer 408', a first spacer layer 410', and a free layer 412' that are analogous to the underlayer 404, the seed layer 406, synthetic the AFM layer 408, the spacer layer 410, and the free layer 412 of the bottom spin valve 400. The dual spin valve 600 also includes a second spacer layer 602, a second synthetic AFM layer 604, and a capping layer 606. The capping layer 606 is analogous to the capping layer 216 or 414. The second spacer layer 602 and the second synthetic AFM layer 604 may be made of those materials used for the first spacer layer 410' and the first synthetic AFM layer 408'.

A dual spin valve, not depicted in Table 1, was also fabricated and characterized. The dual spin valve was fabricated without an underlayer and using thirty Angstroms of NiFeCr as a seed layer. The dual spin valve had a magnetoresistance of fourteen percent, an exchange field of approximately 3200 Oe, and a resistivity of 8.89 Ω/sq.

A method and system has been disclosed for providing a bottom spin valve using an antiferromagnet other than NiO or NiCoO and which has improved magnetoresistance. The method and system could also be used to provide a dual spin valve, which includes a bottom spin valve and a top spin valve. In a dual spin valve, the free layer of the bottom spin

TABLE 1

| Seed Layer Composition | Seed Layer Thickness (Angstroms) | AFM/ Synthetic AFM | ΔR/R (percent) | Exchange Field (Oe) | Coercivity Of Pinned Layer (Oe) | Sheet Resistance (Ω/sq) |
|---|---|---|---|---|---|---|
| None | N/A | PtMn | 5.35 | 449 | 598 | 14.87 |
| None | 15 | PtMn | 6.33 | 838 | 703 | 15.56 |
| Cu | 15 | PtMn | 5.92 | 886 | 641 | 16.1 |
| NiFe/Cu | 15/10 | PtMn | 6 | 630 | 654 | 14.14 |
| NiFe | 15 | Synthetic PtMn | 7.9 | 3390 | N/A | 13.4 |
| NiFeCr | 30 | Synthetic PtMn | 9.42 | 3720 | N/A | 12.77 |
| NiFeCr | 30 | Synthetic IrMn | 10.19 | Approx. 4500 | NIA | 14.9 | valve is also the free layer of the top spin valve. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A spin valve formed on a substrate comprising:
    a seed layer including NiFe and at least one other component material, the seed layer being above the substrate;
    an antiferromagnetic layer on the seed layer, the seed layer providing a desired texture for the antiferromagnetic layer;
    a pinned layer above the antiferromagnetic layer, the pinned layer being exchange coupled to the antiferromagnetic layer;
    a spacer layer above the pinned layer; and
    a free layer above the spacer layer.

2. The spin valve of claim 1 wherein the at least one other component material of the seed layer further includes Cr.

3. The spin valve of claim 2 wherein the seed layer further includes between twenty and fifty atomic percent Cr.

4. The spin valve of claim 3 wherein the seed layer further has a thickness between ten and fifty Angstroms.

5. The spin valve of claim 2 wherein the antiferromagnetic layer further includes IrMn.

6. The spin valve of claim 2 wherein the antiferromagnetic layer further includes PtPdMn.

7. The spin valve of claim 2 wherein the antiferromagnetic layer further includes NiMn.

8. The spin valve of claim 2 wherein the antiferromagnetic layer further includes RhMn.

9. The spin valve of claim 2 wherein the antiferromagnetic layer further includes CrPtMn.

10. The spin valve of claim 1 wherein the at least one other component material of the seed layer further includes a copper layer.

11. The spin valve of claim 1 further comprising:
    a barrier layer between the substrate and the seed layer.

12. The spin valve of claim 1 wherein the spin valve further includes a dual spin valve.

13. A spin valve formed on a substrate comprising:
    a seed layer including NiFe and at least one other component material, the seed layer being above the substrate;
    a synthetic antiferromagnetic layer on the seed layer, the seed layer providing a desired texture for the synthetic antiferromagnetic layer;
    a spacer layer above the synthetic antiferromagnetic layer; and
    a free layer above the spacer layer.

14. The spin valve of claim 13 wherein the spin valve further includes a dual spin valve.

* * * * *